June 10, 1941.                J. L. DE RABOT                2,245,434
                            LEATHER LINK BELT
                           Filed Dec. 21, 1938
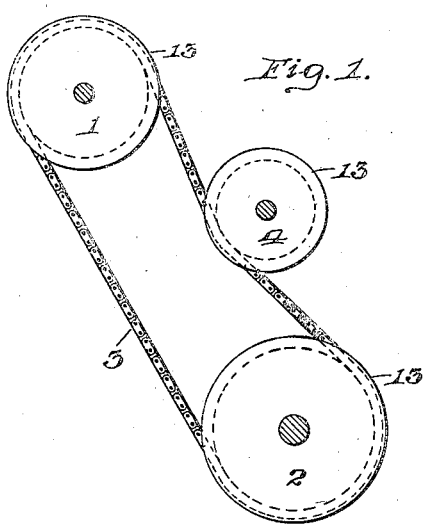
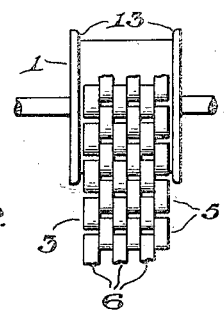
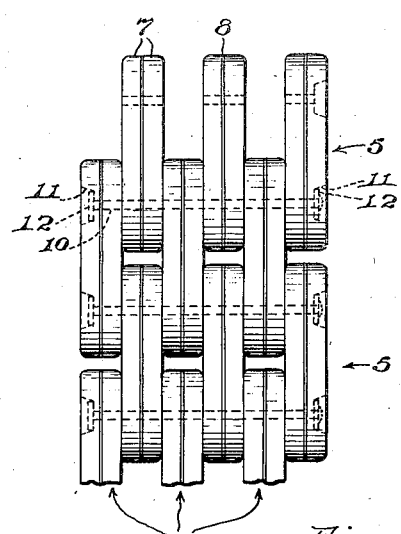
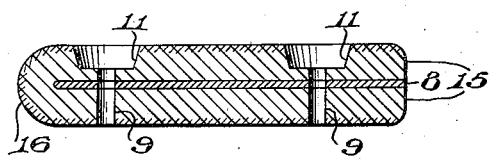
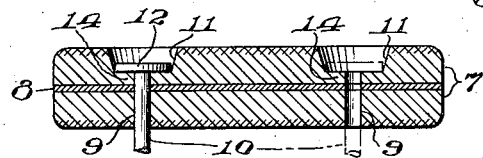
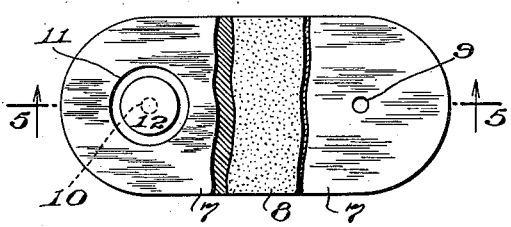
INVENTOR
John L. de Rabot
BY
J. Stuart Freeman
ATTORNEY Patented June 10, 1941

2,245,434

UNITED STATES PATENT OFFICE 2,245,434

LEATHER LINK BELT

John L. de Rabot, Philadelphia, Pa., assignor to Alexander Brothers, Inc., Philadelphia, Pa., a corporation of Pennsylvania Application December 21, 1938, Serial No. 247,130

3 Claims. (Cl. 74—232)

The broad object of the invention is to provide improvements in leather link belts and belting, such as are used in friction drives in which the belt is permitted to slip to variable degrees, by regulating the tension exerted upon the belt by a belt tightener, and by means of which the drive may also be started and stopped. Belts of this type heretofore have been characterized by deficiencies, which have practically precluded their use in any but a relatively narrow field, principally that of driving the winders in the paper making industry.

Another object is to provide a belt of this class, which is especially designed for use on pulleys of such types of devices as the winders in paper mills, wherein from the very nature of the device and its function of operation, it is necessary to permit a very definite and constant slipping of the belt with respect to the pulley. In the case of winders, this provision for a predetermined amount of slippage is due to the fact that the diameter of the paper roll upon the winder constantly increases, so that the winder's pulley, after starting substantially at the same speed as that of the driving pulley, will thereafter continue to rotate relatively more and more slowly, as the quantity and, therefore, the diameter of the paper upon the winder increases, while the speed of the driving pulley continues to rotate at the same uniform speed.

More specifically, a further object is to provide a belt of this character, in which the heretofore excessive heating of the belt, as a result of the friction between the belt and winder pulley, is very materially reduced. This friction and resultant heating is extremely injurious, especially in the case of a belt made of leather, as the high degree of heat tends to burn the life out of the leather, thereby considerably shortening its life. Conversely, therefore, a substantial decrease in such heating obviously results in prolonging the life and resiliency of the leather, thereby reducing to a minimum any tendency of the leather of the links to dry out, stretch and wear, and as a result proportionately prolonging the effective life of the belt as a whole.

Still another object is to provide a link of increased thickness, so that countersinking of one of the plies of a link, in order to depress and protect the end of a link-connecting pin, still leaves a remaining thickness of leather greater than that of the original thickness of a single ply, as heretofore used, which results in a much longer life of the laterally disposed end links, with correspondingly less tendency of these links to break at the pierced and countersunk regions.

A still further object is to provide a laminated link structure, formed of two (or even more) plies of leather unitarily secured together by means of sheet cement, and having their grain (or hair) surfaces directly outwardly or in opposite directions, while the flesh surfaces of the plies are directed towards each other, and are in adhesive contact with the said cement, which with said plies engages the several pulleys and tighteners upon edge.

And a still further object is to provide a slightly modified form of laminated link, which is made from a single piece of leather folded at one end (or even upon one side), and the resulting parallel portions of which are then secured together by means of sheet cement or equivalent medium.

With the objects thus briefly stated, the invention comprises further details of construction and operation, which are hereinafter brought out in the following description, when read in conjunction with the accompanying drawing, in which Fig. 1 is a side elevation of a pair of pulleys and an intervening tightener connected by means of a belt comprising the present invention; Fig. 2 is a fragmentary plan view of a portion of the belt and one of said pulleys; Fig. 3 is an enlarged fragmentary plan view of a portion of the improved belt; Fig. 4 is a still further enlarged plan view of one of the individual links with portions of the layers thereof broken away; Fig. 5 is a longitudinal section of the same on the line 5—5 of Fig. 4; and Fig. 6 is a similar section through a slightly modified form of the same.

Referring to Figs. 1 to 5, two pulleys 1 and 2 are connected together by means of a belt 3 of the improved type, against which presses any well-known form of belt tightener 4. It will be noted that belt as a unitary whole is composed of two sets of a series of parallel rows of links, that is, they are arranged in transversely extending rows 5 and in longitudinally extending rows 6.

Each of the links is composed of at least two plies 7 of leather from any suitable source, secured together by means of an intervening sheet of waterproof cement 8 of great tensile strength. This sheet is of such thickness and composition, that only its surfaces are made tacky while its transversely central or medial portion remains unsoftened, and accordingly retains its original dimensions and physical characteristics. The leather plies, either before or after being trimmed, are then pressed firmly against the opposite tacky surfaces, to which they adhere to such a degree that leather plies and sheet cement are thereafter maintained in such intimate unitary relation, as to all intents and purposes make them appear integral. As the present invention does not relate to the cement per se, it is of no consequence whether its adhesion to the leather plies is produced by mere drying, heating, or otherwise.

Each of the links is pierced by bores 9 for the reception of connecting pins 10, while the outer portions of the bores of the laterally outermost links are countersunk at 11, to shelter and protect the heads 12 of the pins, or the washers carried by their opposite ends, from wear resulting from contact with the flanges 13 of the several pulleys and tighteners. Adjacent to and beneath each such countersunk recess, it will be noted that there still remains a well defined portion of leather 14, in addition to which there is the aligned portion of the other ply, of original thickness and characteristics.

Referring to Fig. 6, a modified form of link is here shown as comprising a single elongated strip of leather, folded centrally at 16 to provide the equivalent of the two separate plies of the preferred form above described. The parallel lateral portions of this strip are secured together by means of the sheet of waterproof cement 8, and provided with the bores 9 and, when necessary, with the countersunk regions 11. Or such a modified form of link might be made from a single piece of leather folded transversely instead of longitudinally as shown, but in either case the result being practically the equivalent to the form first above described.

Among the advantages of a belt of this construction is the fact, that friction between adjacent links in every instance occurs between grain surfaces, instead of between grain and flesh surfaces of the leather, as heretofore universally practiced in so-called standard leather link belting. Also, by at least doubling the thickness of each link, it is possible to deeply countersink the opposite head and butted ends of the several connecting pins, without appreciably impairing the strength of links so treated. Furthermore, as each link in the new construction presents at least two oppositely positioned grain surfaces to the surfaces of the pulleys and tighteners, the respective links remain upright throughout the term of use of the belt, and the wear upon each link is, therefore, both decreased and made transversely uniform. Also, as the coefficient of friction between the plurality of grain surfaces of the leather of each link and the surfaces of the pulleys is appreciably less than that between the internal and flesh surfaces of the leather, unsupported by the stiffer grain surfaces, considerably less heat is produced, and the improved belt lasts proportionately longer, while at the same time exhibiting remarkably less stretch or elongation during use.

Having thus described my invention, what I claim as new and desire to protect by Letters Patent of the United States is:

1. A link belt, comprising a transversely arranged series of links, each of which is composed of a plurality of leather plies, the flesh surfaces of each pair of adjacent plies being inwardly positioned and secured together, a permanent sheet of cementitious material of high tensile strength interposed between adjacent flesh surfaces, each link being apertured, a pin extending through said apertures and operatively connecting said links, and one ply of each of the outermost links of the series being countersunk to receive and protect the opposite ends of said pin.

2. A belt, comprising links each of which is composed of two sections of leather unitarily secured together by an intervening sheet member having opposite surfaces adapted to be made tacky only temporarily and possessing high tensile strength, the grain surfaces of the said leather sections being oppositely directed, and adapted to be normally in simultaneous contact with a pulley surface upon the opposite sides of each composite link.

3. A belt, comprising links each of which is composed of two sections of leather and an intervening layer of waterproof sheet material possessing high tensile strength, said sheet material permanently retaining its physical characteristics except for its surfaces which are made tacky only long enough to be secured to said leather sections, the grain surfaces of the said leather sections being oppositely directed, and adapted to simultaneously contact a pulley surface upon the opposite sides of each composite link.

JOHN L. DE RABOT.